Patented May 15, 1951

2,552,563

UNITED STATES PATENT OFFICE 2,552,563

INSECTICIDE AND MITICIDE COMPOSITIONS COMPRISING HEXAETHYL TETRAPHOSPHATE AND A NITROPHENOLIC COMPOUND

Eugene E. Kenaga, Midland, Mich., assignor to The Dow Chemical Company, Midland, Mich., a corporation of Delaware No Drawing. Application October 2, 1947, Serial No. 777,589

6 Claims. (Cl. 167—31)

This invention relates to parasiticides and is particularly concerned with a composition including as toxicants hexaethyl tetraphosphate and a nitrophenolic compound.

Hexaethyl tetraphosphate (technical grade) is an oily amber liquid having a specific gravity of 1.29 at 27°/4° C. This compound is soluble in water, ethanol, and diethyl ether and substantially insoluble in kerosene and other petroleum fractions. It has recently come into rather wide usage as an agricultural insecticidal toxicant. In such application, the compound accomplishes a quick kill of adult mite and certain insect pests, but has been found to be relatively ineffective as an ovicide and to have little residual toxicity. The exact mechanics of the action of this product is not understood and the possibility exists that much of its effectiveness is attributable to related compounds produced in its manufacture and present in the technical material e. g. tetraethyl pyrophosphate. In the following specification, examples, and claims, reference to hexaethyl tetraphosphate is inclusive of the technical product.

Similarly, nitrophenolic compounds previously have been employed as constituents of parasiticidal materials. Compositions containing these compounds as active toxicants have been found to be somewhat slower in their action against existing adult mites and insects than hexaethyl tetraphosphate, but to have better residual action and to exhibit a measure of ovicidal effectiveness.

The use of either of the foregoing toxicant materials in the proportions and amounts and with the frequency necessary to accomplish commercial control of insect and mite infestations raises problems of foliage injury and in many instances is economically unattractive. This condition is clearly indicative of the desirability of the development of improved techniques for accomplishing a comparable and extended control of parasites with materially reduced amounts of the toxicants in question.

According to the present invention, it has been discovered that the inclusion in a single parasiticidal composition of both hexaethyl tetraphosphate and a nitrophenolic compound results in a product of significantly improved properties as regards ovicidal effectiveness and residual activity. It appears that the toxicants are mutually activating so that a greater than additive or synergistic result is obtained, thereby permitting the utilization of reduced amounts of each toxic constituent and the achievement of results superior to those obtainable with either toxicant alone. This synergistic result is particularly evident as regards the residual activity of the toxicant mixture. Whereas deposits of hexaethyl tetraphosphate alone on tree and plant surfaces appear to exert appreciable lethal effects for 24 hours or less, and the nitrophenolic compounds may be materially reduced in effectiveness several days after application, the mixture of the two continues effective for a much longer time than either toxicant alone. This residual action varies with the particular foliage concerned and with climatic conditions.

The nitrophenolic compounds herein employed are the free phenols having the formula

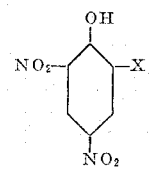

wherein X represents cyclohexyl or an alkyl radical containing from 1 to 8 carbon atoms, inclusive, and the salts of such phenols. These compounds in their pure form are for the most part yellow crystalline solids of varying solubility. They appear to be at least partly miscible with hexaethyl tetraphosphate.

When operating in accordance with the invention, the compounds may be employed in any desirable proportion. A preferred embodiment of the invention comprises an aqueous dispersion adapted to be employed as an agricultural spray and containing from 1.0 to 5.0 parts by weight or more of hexaethyl tetraphosphate for each part by weight of the nitrophenolic compound. For best results, such aqueous dispersion should contain at least 0.125 pound of the nitrophenolic toxicant per 100 gallons, altho this preferred minimum concentration may vary considerably depending upon the particular organism to be controlled. Because of the instability of the hexaethyl tetraphosphate, the spray mixture should be applied as soon as possible following preparation, and the use in such compositions of strongly alkaline wetting, dispersing, or conditioning agents avoided.

The preparation of spray compositions as described above is readily accomplished by separately dispersing the toxicants, or mixtures of each toxicant with suitable wetting and dispersing agents or extenders, with the required amount of water. Application to growing plants is accomplished with conventional equipment and in such fashion as to accomplish the wetting of the infested or infected surfaces.

Wetting and dispersing agents which have been found suitable as additaments in the aqueous spray mixtures include dioctyl sodium sulfosuccinate, sodium lauryl sulfate, polyethyleneglycol phenyl isooctyl ether, and polyoxyalkylene derivatives of sorbitan monolaurate.

Where it is desired to employ the mixture of toxicants in dust compositions, the latter should be applied soon after preparation, and appreciably higher concentrations of both toxicants employed than have been indicated as operable in aqueous spray mixtures. Suitable finely divided carriers include volcanic ash, pyrophyllite, wood and bark flours, and the like.

The preferred embodiment of the invention as regards the nitrophenolic toxicant resides in dicyclohexylamine 2.4-dinitro-6-cyclohexyl-phenolate. This compound is a yellow crystalline solid, melting at 197–198° C., and difficultly soluble in water.

Among the organisms which may be controlled by application of the combination of toxicant materials as described above are aphids, bean mildew, apple scab, European red mite, citrus mite, two-spotted mite, Mexican bean beetle, and southern army worm.

The following examples illustrate the invention but are not to be construed as limiting.

EXAMPLE 1

A parasiticide composition was prepared in the form of a wettable powder by grinding together 20 parts by weight of dicyclohexylamine 2.4-dinitro-6-cyclohexyl-phenolate, 1 part of sodium lauryl sulfate, 5 parts of bentonite, and 74 parts of dusting gypsum. This product is hereinafter referred to as "Concentrate A." Similarly, a liquid concentrate was produced by stirring together 90 parts by weight of hexaethyl tetraphosphate (technical grade) and 10 parts of dioctyl sodium sulfosuccinate, and is hereinafter referred to as "Concentrate B."

Concentrate A was dispersed in water in such amounts as to obtain spray compositions containing from 0.25 to 3.0 pounds of dicyclohexylamine 2.4-dinitro-6-cyclohexyl-phenolate per 100 gallons. These sprays were applied to mature cranberry bean plants infested with southern army worm. As a result of this application, a 0 percent mortality of army worms was obtained at a toxicant concentration of 0.25 pound per 100 gallons. At concentrations increasing from 1 to 3 pounds of the dicyclohexylamine 2.4-dinitro-6-cyclohexyl-phenolate per 100 gallons of spray, from 70 to 100 percent kills of the organism were obtained.

In exactly comparable operations, Concentrate B was dispersed in water to obtain sprays containing from 0.25 to 3 pounds of hexaethyl tetraphosphate per 100 gallons. Against southern army worm no kill was obtained, even at the highest concentration of toxicant.

A further determination, carried out concurrently with those described above, employed both Concentrate A and Concentrate B in the same spray mixture. The amounts of the concentrates were so selected that 100 gallons of the ultimate mixture contained 0.125 pound of dicyclohexylamine 2.4-dinitro-6-cyclohexyl-phenolate and 0.5 pound of hexaethyl tetraphosphate. This composition was applied for the control of southern army worm on mature cranberry beans and found to give a kill of 70 percent.

In each of the foregoing operations, the bean foliage was sprayed with the indicated compositions, the spray residues allowed to dry, and the plants then infested with a known number of insect larvae. All mortality counts were made 72 hours after infestation.

EXAMPLE 2

A similar series of determinations were carried out in which aqueous dispersions of Concentrates A and B, as described in Example 1, and of a combination of the two concentrates were sprayed on cranberry bean foliage for the control of Mexican bean beetle.

A spray mixture, prepared from Concentrate A and containing 0.25 pound of dicyclohexylamine 2.4-dinitro-6-cyclohexyl-phenolate per 100 gallons, gave no kill (0%) of the insects. At 3 pounds of the toxicant per 100 gallons a kill of 80 per cent was obtained.

A spray prepared from Concentrate B and containing 0.5 pound of hexaethyl tetraphosphate per 100 gallons gave 20 percent kill against the Mexican bean beetle. Two pounds of toxicant per 100 gallons was required to cause an 80 percent kill.

An aqueous spray, containing Concentrate A and Concentrate B together in amounts to give 0.125 pound of dicyclohexylamine 2.4-dinitro-6-cyclohexyl-phenolate and 0.5 pound of hexaethyl tetraphosphate per 100 gallons, gave a 70 percent kill of the beetles.

The techniques of spraying and infestation followed in these determinations were identical with those described in Example 1. Again, mortality determinations were based upon observations 72 hours after infestation.

EXAMPLE 3

Concentrates A and B, as described in Example 1, were employed in the preparation of a series of spray compositions for use in the control of two-spotted mite on beans. In these operations, the plants were sprayed, allowed to dry, and groups thereof infested with adult mites at varying intervals following spraying.

One group of the mature cranberry bean plants was sprayed with an aqueous composition comprising sufficient Concentrate A to give 0.125 pound of dicyclohexylamine 2.4 - dinitro - 6 - cyclohexyl-phenolate per 100 gallons. A second group was sprayed with an aqueous dilution of Concentrate B containing 0.5 pound of hexaethyl tetraphosphate per 100 gallons. The third group of plants was sprayed with a dispersion in water of both Concentrates A and B, and containing 0.125 pound of dicyclohexylamine 2.4-dinitro-6-cyclohexyl-phenolate and 0.5 pound of hexaethyl tetraphosphate per 100 gallons.

Specimens from each group of plants were infested with two-spotted mite adults 24 hours after spraying. Five days after infestation the plants were examined and counts made to determine mortalities. The spray containing the nitrophenolic toxicant alone gave a kill of 47 percent with poor ovicidal action. The spray containing the tetraphosphate toxicant alone gave a kill of 22 percent with poor ovicidal action. The spray containing both nitrophenolic and tetraphosphate toxicants gave a kill of 100 percent and good ovicidal action.

A similar series of observations were carried out wherein specimens from each group of sprayed plants were infested with two-spotted mites 48 hours after spraying. Four days after infestation, the nitrophenolic spray had accomplished a kill of 8 percent, and that containing the tetraphosphate toxicant a kill of 20 percent of the adult mites. Again the spray containing the combination of toxicants gave a kill of 100 percent.

A further determination was made in which the sprayed plants were infested 72 hours after spraying and counts made 3 days after infestation. The spray containing the nitrophenolic compound alone gave a kill of 7 percent, and that containing the tetraphosphate alone, a kill of 6 percent of the mites. The spray containing the combination of toxicants gave a kill of 97 percent of the organisms.

EXAMPLE 4

Other compositions containing nitrophenolic toxicants and adapted to be employed in combination with hexaethyl tetraphosphate include the following:

*Concentrate C*

Parts by weight
Dinormalbutylamine 2.4-dinitro-
  6-cyclohexyl-phenolate _____ 18.2
Diatomaceous earth _____ 72.7
Sodium lauryl sulfate _____ 9.1

*Concentrate D*

Parts by weight
Normaloctylamine 2.4-dinitro-
  6-methyl-phenolate _____ 20
Bentonite _____ 77
Glyceryl oleate _____ 3

*Concentrate E*

Parts by weight
2.4-dinitro-6-cyclohexyl-phenol _____ 67
Partially neutralized sulpho-
  nated sperm oil _____ 33

*Concentrate F*

Parts by weight
Sodium 2.4-dinitro-6-secondary-
  butyl-phenolate _____ 90
Sodium salt of alkyl naphthalene
  sulfonic acid _____ 10

*Concentrate G*

Parts by weight
2.4-dinitro-6-normaloctyl-phenol _____ 10
Sodium sulfonate of butylphenyl-
  phenol _____ 10
Talc _____ 80

*Concentrate H*

Parts by weight
Triethanolamine 2.4-dinitro-6-
  normalhexyl-phenolate _____ 100

*Concentrate I*

Parts by weight
Dicyclohexylamine 2.4-dinitro-
  6-cyclohexyl-phenolate _____ 18
Bentonite _____ 62
Dodecylbenzene sodium sulfonate _____ 20

*Concentrate J*

Parts by weight
Ammonium 2.4-dinitro-6-methyl
  phenolate _____ 90
Sorbitan monolaurate _____ 10

*Concentrate K*

Parts by weight
Dodecylamine 2.4-dinitro-6-
  secondaryamyl-phenolate _____ 10
Polyoxyalkylene derivative of
  sorbitan monolaurate _____ 10
Talc _____ 80

I claim:
1. An insecticide and miticide composition comprising as active toxicants (1) a nitrophenolic compound of the class consisting of 2.4-dinitrophenols having the formula:

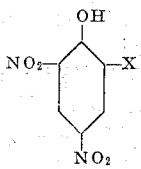

wherein the substituent X is selected from the group consisting of cyclohexyl and alkyl radicals containing from 1 to 8 carbon atoms, inclusive, and the salts of said phenols, and (2) hexaethyl tetraphosphate, and wherein the mixture of toxicants exerts a synergistic effect as regards parasiticidal toxicity.

2. An agricultural insecticidal composition in the form of an aqueous dispersion of (1) a nitrophenolic compound of the class consisting of 2.4-dinitrophenols having the formula:

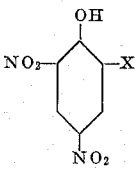

wherein the substituent X is selected from the group consisting of cyclohexyl and alkyl radicals containing from 1 to 8 carbon atoms, inclusive, and the salts of said phenols, and (2) hexaethyl tetraphosphate, and wherein the mixture of toxicants exerts a synergistic effect as regards parasiticidal toxicity.

3. An insecticide and miticide composition comprising as active toxicants (1) from 1 to 5 parts by weight of hexaethyl tetraphosphate for each 1 part by weight of (2) a nitrophenolic compound of the class consisting of 2.4-dinitrophenols having the formula:

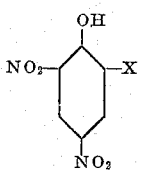

wherein the substituent X is selected from the group consisting of cyclohexyl and alkyl radicals containing from 1 to 8 carbon atoms, inclusive, and the salts of said phenols, and wherein the mixture of toxicants exerts a synergistic effect as regards parasiticidal toxicity.

4. An insecticide and miticide composition comprising as active toxicants (1) dicyclohexylamine 2.4-dinitro-6-cyclohexyl-phenolate, and (2) hexaethyl tetraphosphate, and wherein the mixture of toxicants exerts a synergistic effect as regards parasiticidal toxicity.

5. An agricultural insecticide composition in the form of an aqueous dispersion of (1) dicyclohexylamine 2.4 - dinitro-6-cyclohexyl-phenolate, and (2) hexaethyl tetraphosphate, and wherein the mixture of toxicants exerts a synergistic effect as regards parasiticidal toxicity.

6. An insecticide and miticide composition comprising as active toxicants (1) from 1 to 5 parts by weight of hexaethyl tetraphosphate for each 1 part by weight of (2) dicyclohexylamine 2,4-dinitro-6-cyclohexyl-phenolate, and wherein the mixture of toxicants exerts a synergistic effect as regards parasiticidal toxicity.

EUGENE E. KENAGA.

REFERENCES CITED

The following references are of record in the file of this patent:

UNITED STATES PATENTS

| Number | Name | Date |
| --- | --- | --- |
| 2,143,639 | Caprio | Jan. 10, 1939 |
| 2,225,619 | Britton | Dec. 24, 1940 |
| 2,360,269 | Partansky | Oct. 10, 1944 |

OTHER REFERENCES

Simpson: "Control of Red Spider Mites," Nature, Feb. 24, 1945, page 241. 167–DDT.

Chem. and Eng. News, Sept. 10, 1945, pages 1520, 1521. 167–Phos.

Kilgore: Soap and Sanitary Chemicals, Dec. 1945, pages 138, 139, 169, 171 (page 171 especially pertinent). 167–DDT.

Hall: Report No. 252, Office of Publication Board, Dept. of Commerce, Wash., D. C., Jan. 11, 1946, page 4. 167–DDT.

Martin: "Chemical and Insecticidal Properties of . . . Organic Phosphates," from abstract, Manuf. Chemist, Aug. 1947, page 345. 167–DDT.